United States Patent
Smalley et al.

(10) Patent No.: US 10,129,517 B2
(45) Date of Patent: Nov. 13, 2018

(54) FULL-COLOR FREESPACE VOLUMETRIC DISPLAY WITH OCCLUSION

(71) Applicant: BRIGHAM YOUNG UNIVERSITY, Provo, UT (US)

(72) Inventors: Daniel Smalley, Provo, UT (US); Kenny Squire, American Fork, UT (US)

(73) Assignee: Brigham Young University, Provo, UT (US)

( * ) Notice: Subject to any disclaimer, the term of this patent is extended or adjusted under 35 U.S.C. 154(b) by 255 days.

(21) Appl. No.: 14/959,779

(22) Filed: Dec. 4, 2015

(65) Prior Publication Data

US 2016/0161068 A1 Jun. 9, 2016

Related U.S. Application Data

(60) Provisional application No. 62/088,066, filed on Dec. 5, 2014.

(51) Int. Cl.
| | |
|---|---|
| *G02B 27/22* | (2018.01) |
| *H04N 13/04* | (2006.01) |
| *H04N 13/388* | (2018.01) |
| *G03B 21/00* | (2006.01) |

(52) U.S. Cl.
CPC ....... *H04N 13/049* (2013.01); *G02B 27/2271* (2013.01); *G03B 21/00* (2013.01); *H04N 13/0497* (2013.01); *H04N 13/388* (2018.05)

(58) Field of Classification Search
CPC ............................ H04N 13/049; H04N 13/388
USPC .................................................. 359/446, 452
See application file for complete search history.

(56) References Cited

U.S. PATENT DOCUMENTS

| | | | | |
|---|---|---|---|---|
| 3,808,550 | A | * | 4/1974 | Ashkin ..................... H01S 3/08 250/251 |
| 5,170,890 | A | | 12/1992 | Wilson et al. |
| 5,363,190 | A | | 11/1994 | Inaba et al. |
| 6,466,184 | B1 | * | 10/2002 | Whitesell ........... G02B 27/2271 345/6 |
| 6,997,558 | B2 | * | 2/2006 | Perlin ................. G02B 27/2271 345/419 |
| 2016/0370316 | A1 | * | 12/2016 | Ndukaife ............... G02B 5/008 |

OTHER PUBLICATIONS

Wördemann, Mike, Structured Light Fields Application in Optical Trapping, Manipulation, and Organisation, Springer Theses, pp. 5-26, 2012.*
Ashkin et al.: "Optical trapping and manipulation of single cells using infrared laser beams," Nature, vol. 330, pp. 769-771 (1987).
Clifton et al.: "Direct volume display devices," IEEE Computer Graphics and Applocatopms. vol. 13, Issue 4, pp. 57-65 (1993).
He et al.: "Optical particle trapping with higher-order doughnut beams produced using high efficiency computer generated holograms," Journal of Modern Optics, vol. 42, pp. 217-223 (1995).

(Continued)

*Primary Examiner* — Christopher Mahoney
(74) *Attorney, Agent, or Firm* — Brake Hughes Bellermann LLP

(57) ABSTRACT

A system includes a particle configured for emitting light in response to stimulation by a light beam, a first light source configured for generating a first light beam that traps the particle in a potential well created by the light beam in air, and a second light source configured for generating a second light beam that stimulates the particle to emit emission light.

32 Claims, 5 Drawing Sheets

(56) References Cited

OTHER PUBLICATIONS

Kimura et al.: "Laser produced 3D display in the air," In Proc. ACM SIGGRAPH 2006 Emerging Technologies, Article No. 20, (2006).

Shvedov et al.: "Robust trapping and manipulation of airborne particles with a bottle beam," Optics Express, vol. 19, Issue 18, pp. 17350-17356 (2011).

Blundell: "On the uncertain future of the volumetric 3D display paradigm," 3D Research, 8:11, 14 pages, (2017).

Blundell et al.: "Volumetric Three-Dimensional Display Systems," vol. 1, published by John Wiley & Sons Inc., 358 pages (2000).

Clifton et al.: "Direct volume display devices," IEEE Computer Graphics and Applocatopms. vol. 13, Issue 4, pp. 57-65 (1993), abstract only.

Saito et al.: "Laser-plasma scanning 3D display for putting digital contents in free space," Proc. of SPIE-IS&T Electronic Imaging, vol. 6803, 680309, 10 pages (2008).

Rohatschek: "Direction, magnitude and causes of photophoretic forces," J. Aerosol Sci. vol. 16, Issue 1, pp. 29-42 (1985), abstract only.

Desyatnikov et al.: "Photophoretic manipulation of absorbing aerosol particles with vortex beams: theory versus experiment," Optics Express, vol. 17, No. 10, pp. 8201-8211 (2009).

He et al.: "Optical particle trapping with higher-order doughnut beams produced using high efficiency computer generated holograms," Journal of Modern Optics, vol. 42, pp. 217-223 (1995), abstract only.

van Eymeren et al.: "The implications of particle rotation on the effect of photophoresis," Mon. Not. R. Astron. Soc. 420, pp. 183-186 (2012).

Bowman et al.: "Optical trapping and binding," Rep. Prog. Phys. 76, 29 pages (2013).

Ashkin et al.: "Optical trapping and manipulation of single cells using infrared laser beams," Nature, vol. 330, pp. 769-771 (1987), abstract only.

* cited by examiner

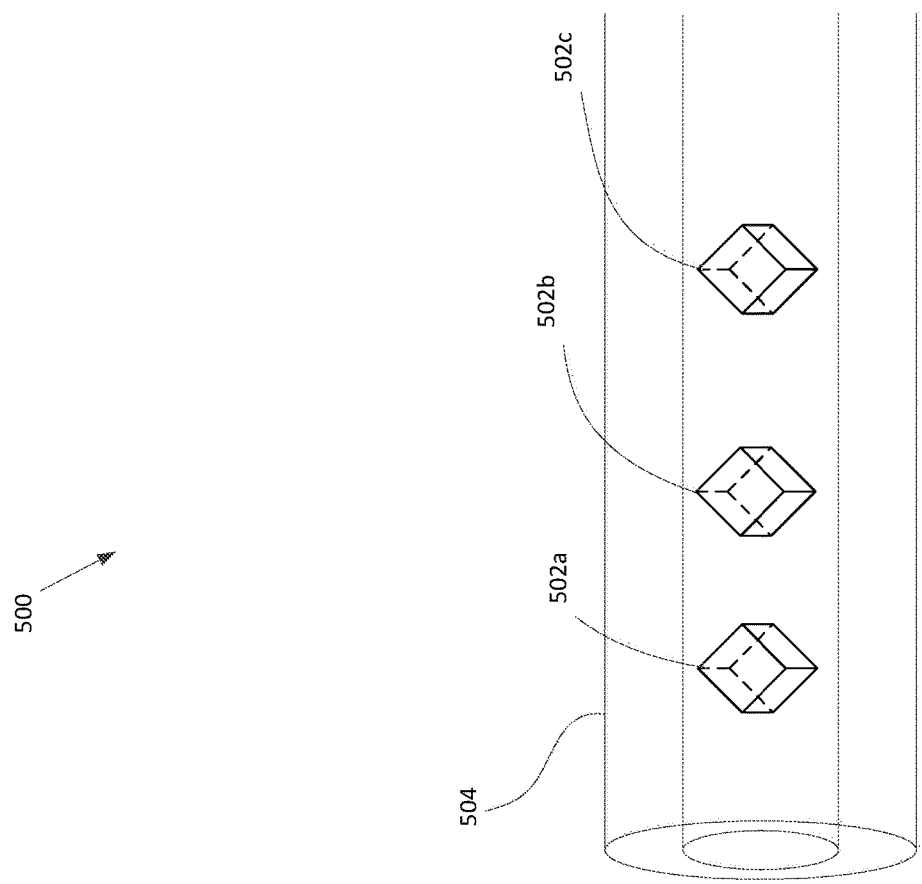

ated herein in it entirety.

FULL-COLOR FREESPACE VOLUMETRIC DISPLAY WITH OCCLUSION

CROSS-REFERENCE TO RELATED APPLICATION

This application is a non-provisional of, and claims priority under 35 U.S.C. § 119 to, U.S. Provisional Patent Application No. 62/088,066, filed Dec. 5, 2014, entitled "FULL-COLOR FREESPACE VOLUMETRIC DISPLAY WITH OCCLUSION," the disclosure of which is incorporated herein in it entirety.

BACKGROUND

Existing three-dimensional volumetric displays can be created by ionizing separate and discrete small volumes of air to create a plasma, which causes a small flash of light at the ionization locations. The locations at which the plasma is created can be rastered within a three-dimensional space to create a three-dimensional display. However, such displays are monochromatic and also are accompanied by a loud popping sound because of the plasma. Furthermore, high-power, high cost lasers are required to create the plasmas. Also the plasma displays demonstrated to date have spots that emit light in all directions (isotropically) precluding the possibility of one image point eclipsing another to create the 3d cue of occlusion.

SUMMARY

In a first general aspect, a system includes a particle configured for emitting light in response to stimulation by a light beam, a first light source configured for generating a first light beam that traps the particle in a potential well created by the light beam in air, and a second light source configured for generating a second light beam that stimulates the particle to emit emission light.

Implementations can include one or more of the following features, alone or in combination with each other. For example, the emission light can include scattered light from the second light beam. The emission light can include fluorescence light emitted in response to stimulation by the second light beam. The emission light can include coherent laser light emitted in response to stimulation by the second light beam. The particle can include a PN junction and an optical cavity configured to generate the coherent laser light in response to the stimulation by the second light beam.

The particle can be an anisotropic particle that emits light anisotropically in response to stimulation by the second light beam. The first light beam can exert a force on the particle that orients the particle in a predetermined direction in space. The potential created by the light beam can be associated with a focal point of the first light beam, and the system can further include beam scanning optical elements configured for translating the focal point in three-dimensional space in the air while the particle is trapped in the potential. The beam scanning optical elements can be configured to repeatedly translate the focal point in a pattern in the air while the particle is trapped by the first light beam and while the second light beam stimulates the particle to emit emission light, and wherein the pattern is repeated at a rate of greater than 20 Hz.

The second light beam can include visible light, and the second light beam can have a different color when the focal point is at different points of the repeated pattern. The first light beam can include invisible electromagnetic radiation, and the second light beam can include visible electromagnetic radiation. The first light beam and the second light beam can propagate co-linearly.

In another general aspect, a system includes a particle configured for emitting light in response to stimulation by a light beam, a light source configured for generating a light beam having a first wavelength, where the light beam traps the particle in a potential well created by the light beam in air and that stimulates the particle to emit light of a second wavelength different from the first wavelength.

Implementations can include one or more of the following features, alone or in combination with each other. For example, the emission light can include fluorescence light emitted in response to stimulation by the second light beam. The emission light can include coherent laser light emitted in response to stimulation by the second light beam. The particle can include a PN junction and an optical cavity configured to generate the coherent laser light in response to the stimulation by the second light beam. The particle can be an anisotropic particle that emits light anisotropically in response to stimulation by the second light beam.

The potential created by the light beam can be associated with a focal point of the first light beam, and the system can further include beam scanning optical elements configured for translating the focal point in three-dimensional space in the air while the particle is trapped in the potential. The beam scanning optical elements can be configured to repeatedly translate the focal point in a pattern in the air while the particle is trapped by the light beam and stimulated by the light beam to emit the light having the second wavelength, and the pattern is repeated at a rate of greater than 20 Hz. The light beam can exert a force on the particle that orients the particle in a predetermined direction in space.

The details of one or more implementations are set forth in the accompanying drawings and the description below. Other features will be apparent from the description and drawings, and from the claims.

BRIEF DESCRIPTION OF THE DRAWINGS

FIG. 5 is a schematic diagram of a system in which anisotropic particles are trapped within the beam waist of a beam of electromagnetic radiation.

Like reference numerals in the different figures describe like elements in the different figures.

DETAILED DESCRIPTION

While example embodiments may include various modifications and alternative forms, it should be understood, however, that there is no intent to limit example embodiments to the particular forms disclosed, but on the contrary, example embodiments are to cover all modifications, equivalents, and alternatives.

This disclosure relates to a full-color, volumetric displays that are capable of occlusion. The display can be used, for example, as a screenless display to present three-dimensional images and video data to a user. The three-dimensional positions of small particles can be controlled by forces generated by one or more first lasers or light sources, and the particles can be illuminated by one or more second lasers or light sources to create a visible three-dimensional display. The second lasers or light sources can include lasers having different colors, so that the three-dimensional display can accommodate a large color gamut.

Figure 1:
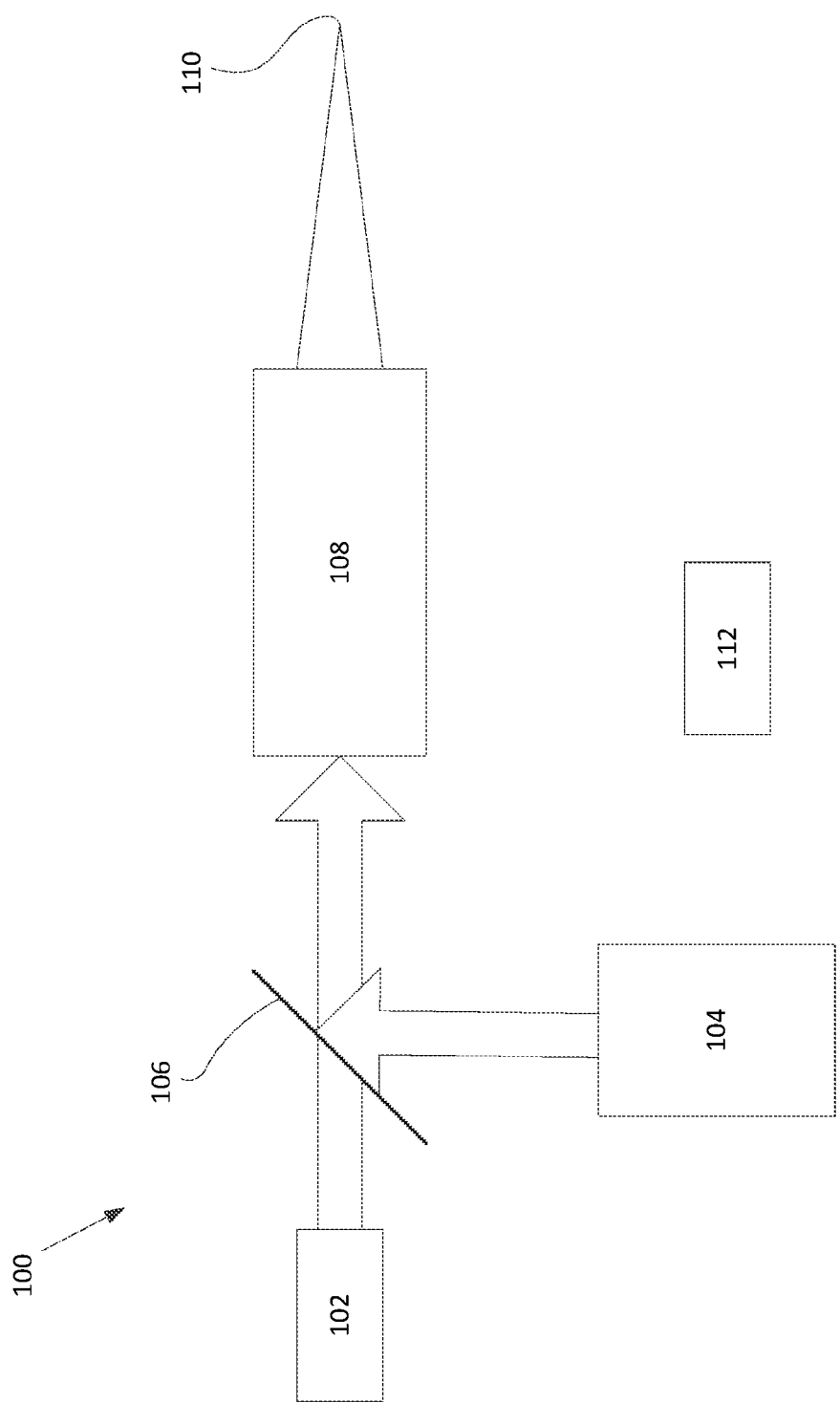
FIG. 1 is a schematic diagram of a system for providing a full-color, volumetric display.

FIG. 1 is a schematic diagram of a system 100 for providing a full-color, volumetric display. The system includes one or more first light sources (e.g., lasers, light emitting diodes, etc.) 102 that can be used to trap and manipulate the positions of one or more particles. The system 100 further includes one or more second light sources (e.g., lasers, light emitting diodes, etc.) 104 that can be used to illuminate the articles with a variety of different colors that may be mixed to provide a full spectrum of visible light. In some implementations, the first light source(s) 102 can include a laser that operates at a wavelength in the electromagnetic spectrum, which is not within the range of human vision. For example, the first light source 102 can include an infrared laser that provides electromagnetic radiation having a wavelength longer than about 800 nm. The second light sources 104 can include a plurality of lasers (e.g., solid state lasers) that operate at different wavelengths within the visible spectrum. For example, the second light sources 104 can include a red laser, a green laser, and a blue laser.

The electromagnetic radiation from the first light source 102 and the second light source 104 can be combined by an optical element (e.g., a beam splitter) 106, so that the electromagnetic radiation from the two light sources travels co-linearly through scanning and focusing optical elements 108. The optical elements 108 can focus the electromagnetic radiation from the light sources 102, 104 to a focal point 110.

Particles can be trapped and manipulated by the light from the first light source 102 as a result of interactions of the particle with the light. In some implementations, particles can be trapped at the focal point 110 by forces created by the focused beam(s) of light from one or more of the light sources. In some implementations, the beam waist of the focused light from the first light source 102 can create a gradient force trap, in which a strong electric field gradient attracts dielectric particles along the gradient to the region of the strongest electric field at the center of the beam waist. Thus, a particle trapped by the gradient force trap of the light from the first light source 102 can remain fixed in place in a three dimensional space. In some implementations, particles can be trapped in potential wells very near the focal point 110, where the location of the minimum potential of the wells results from the combination of a gradient trapping force toward the minimum beam waist location and a radiation pressure force in a direction of propagation of the light beam. In some implementations, particles can be trapped due to non-uniform heating of the particle by the light. In some implementations, a beam waist having an intensity profile that initially increases with increasing radius (e.g., a "doughnut hole" profile) may be used to trap particles, as particles may be attracted to lower intensity regions within the beam waist.

In addition, the light beam that traps a particle can be scanned within the three-dimensional space, and while the light beam is scanned, the trapped particle can be dragged through the three-dimensional space by the forces created by the focused beam from the first light source 102. In some implementations, the light beam(s) produced by the first source(s) 102, 104 also may be used to orient the trapped particle within the three-dimensional space. For example, the light beam(s) produced by the first source(s) 102, 104 may be used to create rotational forces on the particle to turn and orient the particle at a fixed location in space. The manipulation of particle orientation may be accomplished by modifying the amplitude or polarization of the holding beam. For example, by tilting the lens through which the holding beam passes the light field can become skewed and asymmetric and may favor a change in particle orientation.

Light from the second light sources 104 also can be focused to the focal point 110. In some implementations, light from the second light sources can be scattered off the trapped particle, and the scattered light can be viewed by a viewer. In some implementations, light from the second light sources can be absorbed by the trapped particle, which then, in response to the absorbed light, can emit fluorescence radiation that can be viewed by a viewer. In such an implementation both the first and second sources may be invisible to the human eye, leaving only the light emitted by the particle to be observed without being degraded by other visible sources. Light from the second light sources 104 can include light having a plurality of different wavelengths. For example, red, green, and blue light can be provided by the second light sources 104.

In some implementations, the trapped particle can include a PN junction with a light emitting band gap such as a light emitting diode or laser diode. For example, in some implementations, the trapped particle can include an optical laser cavity with a partially reflecting mirror at one end of the cavity and a high-reflectivity mirror at the other end of the cavity. Light from the second and/or first laser beam stimulate the emission of light having a wavelength corresponding to the band gap and the stimulated emission can be multiplied within the laser cavity, which a portion of the light in the cavity is coupled out of the cavity through the partially-reflecting mirror to produce laser light. The laser light can be emitted in a preferential direction defined by the geometry of the laser cavity of the particle.

In some implementations in which the trapped particle includes a PN junction with a light emitting band gap, the first light source 102 can both trap and manipulate the orientation of the PN junction as well as provide pumping energy to the PN junction of the particle. When energized, the particle may emit stimulated light such as laser light that can be visible and highly directional. The first light beam(s) from first light source(s) 102 may be used to trap, pump, modulate and steer the luminous particle's output.

The intensities of the different colors can be controlled by a computer system 112, and by controlling the intensities of the different colors, any arbitrary color within the spectrum of human vision can be provided to the focal point 110 at which the trapped particle is held. The focusing and scanning optical elements 108 also can be subject to control by the computer system 112, such that the focal point 110 can be moved to different positions within the three-dimensional space as determined by the computer system 112.

By scanning the focal point 110 through the three-dimensional space, a full-color volumetric display can be created. For example, by rastering the focal point 110 through the three-dimensional space at a rapid rate (e.g., at a rate faster than the response rate of the human eye) an image of a three-dimensional object can be created in space for viewing by a viewer.

Because the position and orientation of the particle can be manipulated in freespace, the illuminated particle may be used to draw images immediately adjacent to physical objects, including observers, in the environment. For example, a particle trapped in the focal point of the first light beam can be repeatedly translated in a pattern in the air while the particle while the second light beam stimulates the particle to emit emission light. When the pattern is repeated at a rate that is faster than the response of the human eye, (e.g., a at rate greater than 20 Hz), the pattern may appear to be solid in space. In this manner, three-dimensional objects may appear to be created in space. The co-location of such objects created from the interaction of light with one or more trapped particles and observers may be used to facilitate human interaction with an image by touch.

Figure 2:
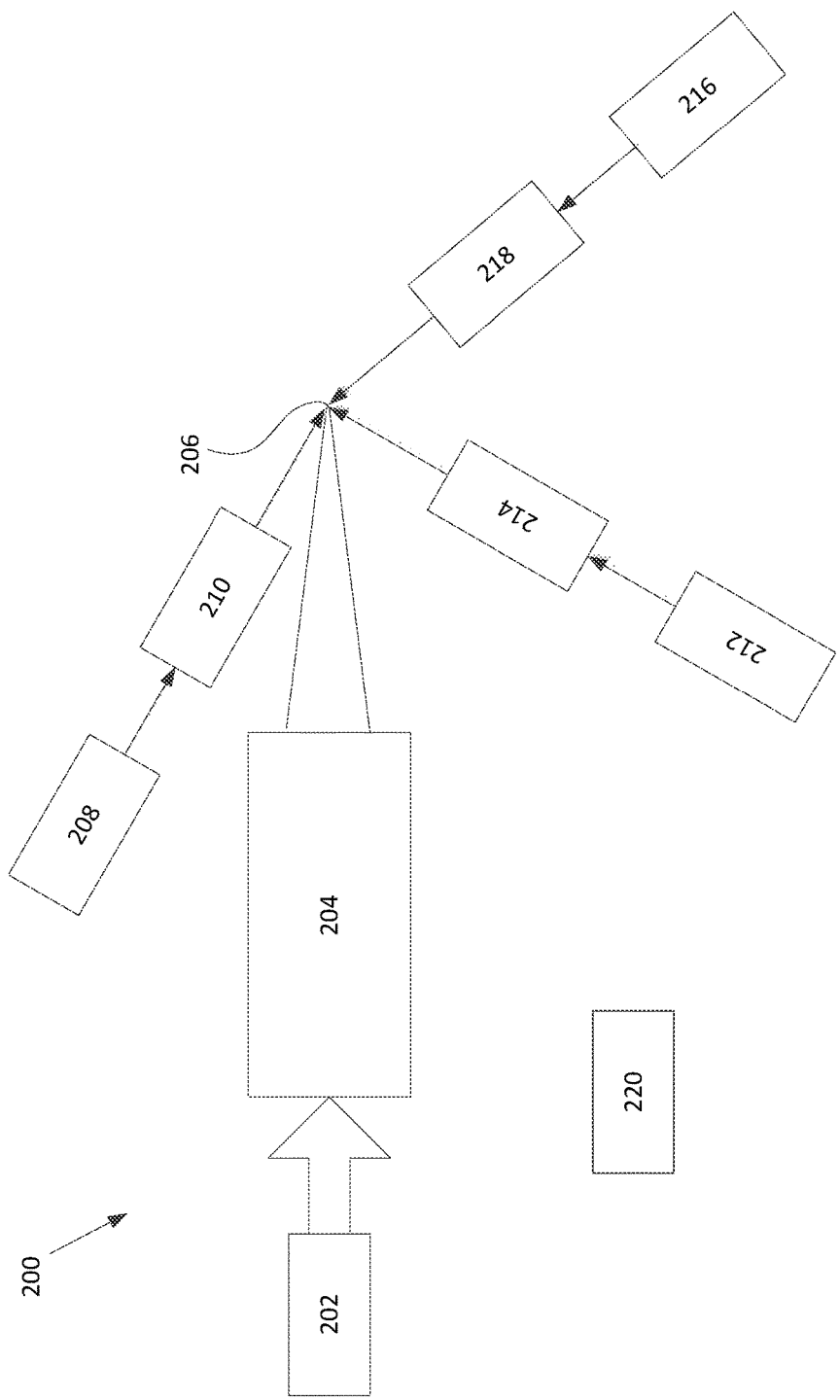
FIG. 2 is another schematic diagram of a system for providing a full-color, volumetric display.

FIG. 2 is another schematic diagram of a system 200 for providing a full-color, volumetric display. The system includes a first light source 202 that provides electromagnetic radiation that is focused by scanning and focusing optical elements 204 to a focal point 206. Light from the first light source 202, when focused to the focal point 206 can create a gradient force trap that can trap a particle within the beam waist of the focused beam at the focal point 206.

The system 200 can include a plurality of second light sources 208, 212, 216 and respective scanning and focusing optical elements 210, 214, 218, which, in conjunction with each other, can focus light from the second light sources to the focal point 206. Light from the second light sources 210, 214, 218 can illuminate the trapped particle at the focal point 206, and scattered or fluorescence light from the trapped particle can be viewed by a viewer.

A computer system 220 can control the light sources 202, 208, 212, 216 (e.g., the intensities of light emitted from the light sources) and can control the scanning and focusing optical elements 204, 210, 214, 218. For example, the computer system 220 can control the scanning and focusing optical elements to move the focal point 206 within the three-dimensional space. By scanning the focal point 206 through the three-dimensional space, a full-color volumetric display can be created. For example, by rastering the focal point 206 through the three-dimensional space at a rapid rate (e.g., at a rate faster than the response rate of the human eye) an image of a three-dimensional object can be created in space for viewing by a viewer.

Figure 3:
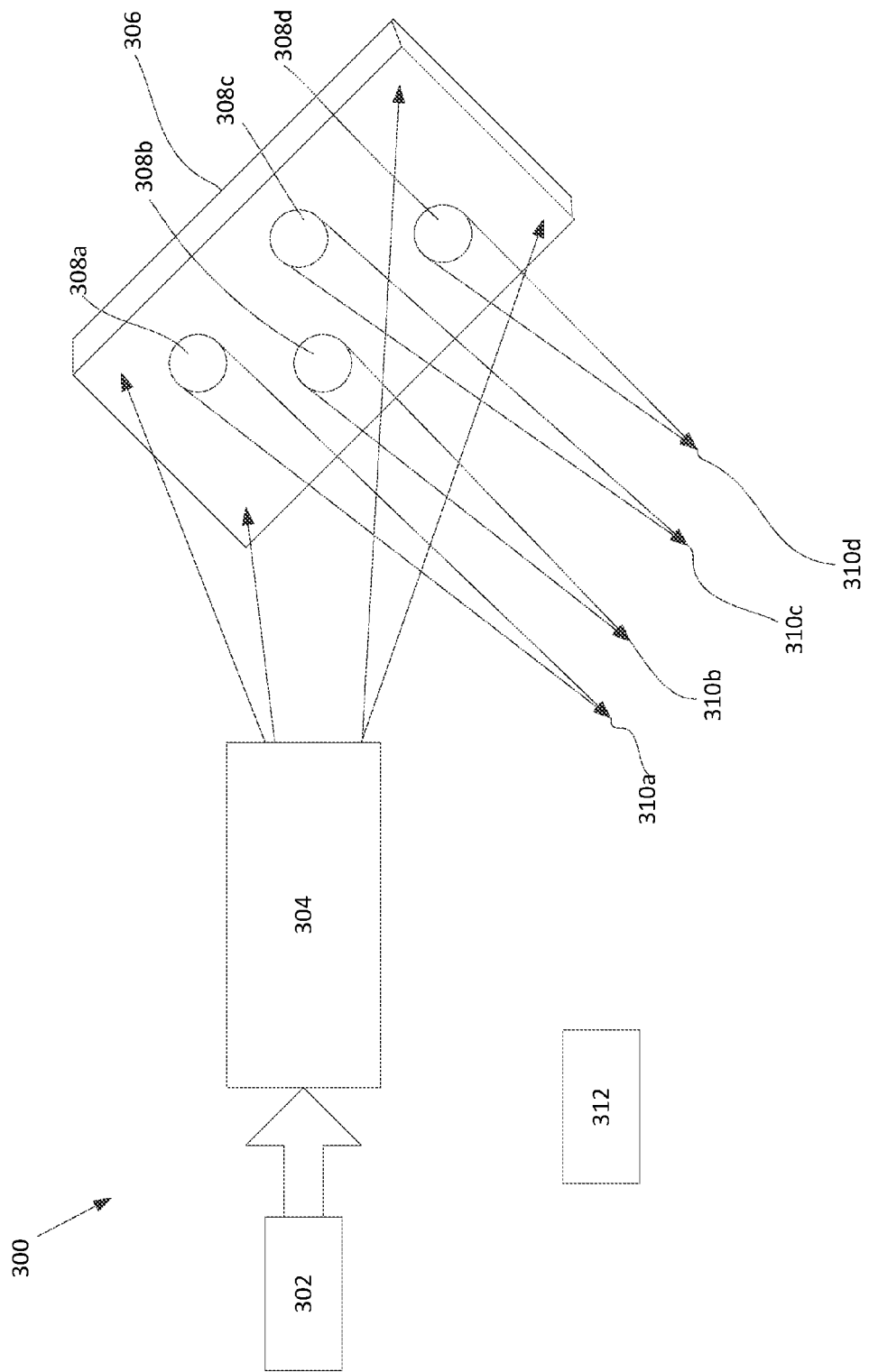
FIG. 3 is schematic diagram of another system for providing a full-color, volumetric display.

FIG. 3 is schematic diagram of another system 300 for providing a full-color, volumetric display. The system 300 includes a light source 302 that provides a light beam to scanning and focusing optical elements 304. The scanning and focusing optical elements 304 can expand the beam from the light source 302 and provide the expanded beam to a wavefront modulating element 306. In some implementations, the wavefront modulating element 306 can include a micro-deformable mirror. In some implementations, the wavefront modulating element 306 can include a spatial light modulator.

A plurality of individual regions 308a, 308b, 308c, 308d of the wavefront modulating element 306 can be separately and independently controlled to focus light from the regions 308a, 308b, 308c, 308d to a plurality of respective focal points 310a, 310b, 310c, 310d. Each of the plurality of focal points 310a, 310b, 310c, 310d can create a gradient force trap that can trap a particle within the beam waist of the light at the focal point. Trapped particles can be illuminated by second light sources (not shown) that can illuminate the particles with a full-color spectrum of light for viewing by a viewer.

A computer system 312 can control the light sources 302 (e.g., the intensity of light emitted from the light source) and can control the scanning and focusing optical elements 304 and the wavefront modulating element 306. For example, a computer system 312 can control the wavefront modulating element 306 to move the focal points 310a, 310b, 310c, 310d within the three-dimensional space. By scanning the focal points 310a, 310b, 310c, 310d through the three-dimensional space, a full-color volumetric display can be created. For example, by rastering the focal points 310a, 310b, 310c, 310d through the three-dimensional space at a rapid rate (e.g., at a rate faster than the response rate of the human eye) and illuminating the particles with one or more second light sources, an image of a three-dimensional object can be created in space for viewing by a viewer.

Figure 4:
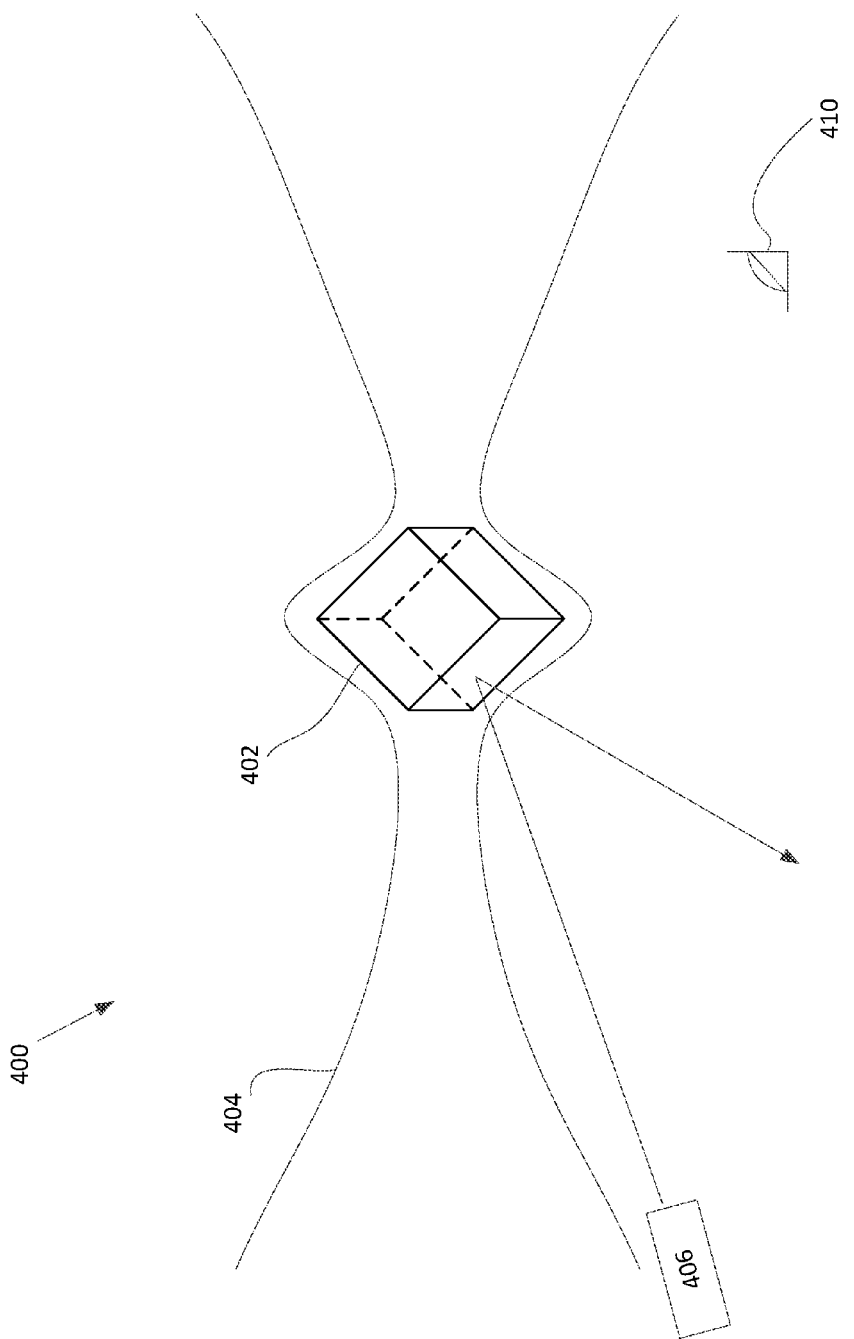
FIG. 4 is a schematic diagram of a system in which an anisotropic particle is trapped within the beam waist of a beam of electromagnetic radiation.

Particles that are trapped for use in the systems 100, 200, 300 described above can be isotropic or anisotropic. FIG. 4 is a schematic diagram of a system 400 in which an anisotropic particle 402 is trapped within the beam waist of a beam 404 of electromagnetic radiation. The particle 402 is illuminated by visible light from a light source 406, and light scattered from the particle 402 can be viewed by a viewer at a first viewing location 408. Because the particle 402 is anisotropic, light from the light source 408 may not be scattered in all directions from the particle. For example, the anisotropic particle 402 may occlude scattered light from reaching a viewer at a second viewing location 410. By using such anisotropic particles 402 in the systems 100, 200, 300 described above, full-color volumetric displays can be created in which the entire display, or any particular point or points in the display, can be viewed from an independent preferential direction while preventing the display of the entire display, or the particular point or points in the display, from being viewed from another direction. Anisotropic particles might include, for example, thin wafers of materials, such as silicon, which can be subdivided (e.g., by cleaving, crushing or diesawing) into small flat shapes of materials, which might act as small mirrors that scatter light preferentially in one direction. Similarly, flat particles may be made from liquid materials, such as black liquor, which can be spun to form a thin film and then fractured to create small flat particles. Anisotropic particles may also be formed with multiple facets in silicon, silicon dioxide, silicon nitride and other materials with ion milling and other techniques used to create MEMs devices. These multifacet particles may be shaped as polygonal mirrors with mirrors along one or more axes. These particles might also include complex prism structures.

FIG. 5 is a schematic diagram of a system 500 in which anisotropic particles 502a, 502b, 502c are trapped within the beam waist of a beam 504 of electromagnetic radiation. As shown in FIG. 5, the beam waist of beam 504 has an intensity profile that has a minimum along the axis of the beam and then increases (at least initially) with increasing radius. Particles 502a, 502b, 502c can be trapped within the beam, for example, by being attracted to the minimum intensity region of the beam waist.

The full-color volumetric displays described herein can be used in a variety of implementations. For example, the full-color volumetric displays can be used to display air-traffic control information, for example, the three-dimensional positions of a number of planes near an airport, to a viewer. In another implementation, the full-color volumetric displays described herein can be used to provide an augmented reality tool for engineering and construction applications. For example, three-dimensional models of mechanical, chemical, biological structures can be displayed. In another implementation, the full-color volumetric display can be provided, not within an empty space, but within a space that is shared with a real object, for example, to provide additional information about the real object, such as internal structure of the object or other features of the object.

Techniques described herein may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst particular combinations of features described herein, the scope of the present disclosure is not limited to the particular combinations, but instead extends to encompass any combination of features or embodiments herein disclosed irrespective of whether or not that particular combination has been specifically enumerated.

What is claimed is:

1. A system comprising:
    a particle configured for emitting light in response to stimulation by a light beam;
    a first light source configured for generating a first light beam that traps the particle in a potential well created by the light beam in air, wherein the potential well created by the light beam is associated with a focal point of the first light beam;
    beam scanning optical elements configured for translating the focal point in three-dimensional space in the air while the particle is trapped in the potential well; and
    a second light source configured for generating a second light beam that stimulates the particle to emit emission light.

2. The system of claim 1, wherein the emission light includes scattered light from the second light beam.

3. The system of claim 1, wherein the emission light includes fluorescence light emitted in response to stimulation by the second light beam.

4. The system of claim 1, wherein the emission light includes coherent laser light emitted in response to stimulation by the second light beam.

5. The system of claim 1, wherein the particle includes a PN junction and an optical cavity configured to generate the coherent laser light in response to the stimulation by the second light beam.

6. The system of claim 1, wherein the particle is an anisotropic particle that emits light anisotropically in response to stimulation by the second light beam.

7. The system of claim 1, wherein the beam scanning optical elements are configured to repeatedly translate the focal point in a pattern in the air while the particle is trapped by the first light beam and while the second light beam stimulates the particle to emit emission light, and wherein the pattern is repeated at a rate of greater than 20 Hz.

8. The system of claim 7, wherein the second light beam includes visible light and wherein the second light beam has a different color when the focal point is at different points of the repeated pattern.

9. The system of claim 1, wherein the first light beam includes invisible electromagnetic radiation, and wherein the second light beam includes visible electromagnetic radiation.

10. The system of claim 1, wherein the first light beam and the second light beam are co-linear.

11. The system of claim 1, wherein the first light beam exerts a force on the particle that orients the particle in a predetermined direction in space.

12. A system comprising:
  a particle configured for emitting light in response to stimulation by a light beam;
  a light source configured for generating the light beam, the light beam having a first wavelength, wherein the light beam is configured to trap the particle in a potential well created by the light beam in air, wherein the potential created by the light beam is associated with a focal point of the light beam, and wherein the light beam is configured to stimulate the particle to emit light of a second wavelength different from the first wavelength; and
  beam scanning optical elements configured for translating the focal point in three-dimensional space in the air while the particle is trapped in the potential well.

13. The system of claim 12, wherein the emission light includes fluorescence light emitted in response to stimulation by the second light beam.

14. The system of claim 12, wherein the emission light includes coherent laser light emitted in response to stimulation by the second light beam.

15. The system of claim 12, wherein the particle includes a PN junction and an optical cavity configured to generate the coherent laser light in response to the stimulation by the second light beam.

16. The system of claim 12, wherein the particle is an anisotropic particle that emits light anisotropically in response to stimulation by the second light beam.

17. The system of claim 12, wherein the beam scanning optical elements are configured to repeatedly translate the focal point in a pattern in the air while the particle is trapped by the light beam and stimulated by the light beam to emit the light having the second wavelength, and wherein the pattern is repeated at a rate of greater than 20 Hz.

18. The system of claim 12, wherein the light beam exerts a force on the particle that orients the particle in a predetermined direction in space.

19. A system comprising:
  a particle configured for emitting light in response to stimulation by a light beam;
  a first light source configured for generating a first light beam that traps the particle in a potential well created by the light beam in air, wherein first light beam has an intensity profile that has a minimum along the axis of the beam and then increases with increasing radius and wherein the potential created by the light beam is associated with the axis of the light beam;
  beam scanning optical elements configured for translating the axis of the light beam in three-dimensional space in the air while the particle is trapped in the potential well; and
  a second light source configured for generating a second light beam that stimulates the particle to emit emission light.

20. The system of claim 19, wherein the emission light includes scattered light from the second light beam.

21. The system of claim 19, wherein the emission light includes fluorescence light emitted in response to stimulation by the second light beam.

22. The system of claim 19, wherein the emission light includes coherent laser light emitted in response to stimulation by the second light beam.

23. The system of claim 19, wherein the particle includes a PN junction and an optical cavity configured to generate the coherent laser light in response to the stimulation by the second light beam.

24. The system of claim 19, wherein the particle is an anisotropic particle that emits light anisotropically in response to stimulation by the second light beam.

25. The system of claim 19, wherein the first light beam includes invisible electromagnetic radiation, and wherein the second light beam includes visible electromagnetic radiation.

26. The system of claim 19, wherein the first light beam and the second light beam are co-linear.

27. The system of claim 19, wherein the first light beam exerts a force on the particle that orients the particle in a predetermined direction in space.

28. A system comprising:
  a particle configured for emitting light in response to stimulation by a light beam;
  a light source configured for generating the light beam, the light beam having a first wavelength, wherein the light beam is configured to trap the particle in a potential well created by the light beam in air, wherein the light beam has an intensity profile that has a minimum along the axis of the light beam and then increases with increasing radius and wherein the potential created by the light beam is associated with the axis of the light beam, and wherein the light beam is configured to stimulate the particle to emit light of a second wavelength different from the first wavelength; and
  beam scanning optical elements configured for translating the axis of the light beam in three-dimensional space in the air while the particle is trapped in the potential well.

29. The system of claim 28, wherein the emission light includes fluorescence light emitted in response to stimulation by the second light beam.

30. The system of claim 28, wherein the emission light includes coherent laser light emitted in response to stimulation by the second light beam.

31. The system of claim 28, wherein the particle includes a PN junction and an optical cavity configured to generate the coherent laser light in response to the stimulation by the second light beam.

32. The system of claim 28, wherein the particle is an anisotropic particle that emits light anisotropically in response to stimulation by the second light beam.

* * * * *

UNITED STATES PATENT AND TRADEMARK OFFICE
CERTIFICATE OF CORRECTION

PATENT NO. : 10,129,517 B2  
APPLICATION NO. : 14/959779  
DATED : November 13, 2018  
INVENTOR(S) : Smalley et al.

Page 1 of 1

It is certified that error appears in the above-identified patent and that said Letters Patent is hereby corrected as shown below:

On the Title Page

Column 2, Item (56), under "OTHER PUBLICATIONS", Line 7, delete "Applocatopms." and insert -- Applications, --, therefor.

On Page 2, Column 1, Item (56), under "OTHER PUBLICATIONS", Line 11, delete "Applocatopms." and insert -- Applications, --, therefor.

In the Claims

In Column 8, Claim 1, Line 52, delete "system" and insert -- system, --, therefor.

In Column 9, Claim 12, Line 34, delete "system" and insert -- system, --, therefor.

In Column 10, Claim 19, Line 4, delete "system" and insert -- system, --, therefor.

In Column 10, Claim 28, Line 47, delete "system" and insert -- system, --, therefor.

Signed and Sealed this  
Twelfth Day of February, 2019

Andrei Iancu  
*Director of the United States Patent and Trademark Office*